US012790448B2

(12) United States Patent
Shim et al.

(10) Patent No.: US 12,790,448 B2
(45) Date of Patent: Nov. 10, 2026

(54) POLYHYDROXYALKANOATE (PHA) DISPERSION AND PREPARATION METHOD THEREFOR

(71) Applicant: CJ CHEILJEDANG CORPORATION, Seoul (KR)

(72) Inventors: Yoo-Kyoung Shim, Seoul (KR); Soyun Park, Seoul (KR); Jeung Yil Park, Seoul (KR); Jin Su Chung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 450 days.

(21) Appl. No.: 18/292,194

(22) PCT Filed: Jul. 29, 2022

(86) PCT No.: PCT/KR2022/011218
§ 371 (c)(1),
(2) Date: Jan. 25, 2024

(87) PCT Pub. No.: WO2023/008959
PCT Pub. Date: Feb. 2, 2023

(65) Prior Publication Data
US 2024/0279407 A1 Aug. 22, 2024

(30) Foreign Application Priority Data
Jul. 30, 2021 (KR) ........................ 10-2021-0101052

(51) Int. Cl.
*C08J 3/11* (2006.01)
*C08J 3/07* (2006.01)

(52) U.S. Cl.
CPC . *C08J 3/11* (2013.01); *C08J 3/07* (2013.01); *C08J 2367/04* (2013.01)

(58) Field of Classification Search
CPC ............. C08J 3/11; C08J 3/07; C08J 2367/04
(Continued)

(56) References Cited

U.S. PATENT DOCUMENTS

2013/0225761 A1 8/2013 Whitehouse
2020/0048493 A1 2/2020 Grubbs, III et al.

FOREIGN PATENT DOCUMENTS

EP 3608415 A1 * 2/2020 ................ C08L 5/00
EP 4052784 A1 9/2022
(Continued)

OTHER PUBLICATIONS

Extended European Search Report issued in corresponding European Patent Application No. 22849933.1, dated Aug. 14, 2025.
(Continued)

*Primary Examiner* — Robert S Jones, Jr.
*Assistant Examiner* — Elizabeth Amato
(74) *Attorney, Agent, or Firm* — Morgan, Lewis & Bockius LLP

(57) ABSTRACT

The present invention relates to a polyhydroxyalkanoate (PHA) dispersion and a preparation method therefor. Specifically, according to one embodiment of the present invention, a method for preparing a PHA dispersion comprises a step of dispersing a PHA in a solvent by using particle dispersion, melt dispersion or solvent extraction, so that a PHA dispersion, which comprises PHA particles having an average diameter of 0.5-5 μm and a deviation of diameter of ±0.3 μm, can be prepared, and thus dispersibility, dispersion stability and processability can be improved.

20 Claims, 2 Drawing Sheets

(58) Field of Classification Search
USPC .......................................................... 523/336
See application file for complete search history.

(56) References Cited

FOREIGN PATENT DOCUMENTS

| | | | | |
|---|---|---|---|---|
| JP | H09-191893 | A | 7/1997 | |
| JP | 2000-502375 | A | 2/2000 | |
| JP | 2000-166587 | A | 6/2000 | |
| JP | 2002-517582 | A | 6/2002 | |
| JP | 2003-175092 | A | 6/2003 | |
| JP | 2003-535996 | A | 12/2003 | |
| JP | 2004-250629 | A | 9/2004 | |
| JP | 2006-274182 | A | 10/2006 | |
| JP | 2013-042915 | A | 3/2013 | |
| JP | 2019-097518 | A | 6/2019 | |
| JP | 2019-515789 | A | 6/2019 | |
| JP | 20170234058 | * | 6/2019 | ................ C08L 5/00 |
| KR | 10-2012-0103158 | A | 9/2012 | |
| WO | 97/21762 | A1 | 6/1997 | |
| WO | 99/64498 | A1 | 12/1999 | |
| WO | 01/94697 | A2 | 12/2001 | |
| WO | 2017/156381 | A1 | 9/2017 | |
| WO | 2018/186278 | A1 | 10/2018 | |
| WO | 2020/100598 | A1 | 5/2020 | |

OTHER PUBLICATIONS

International Search Report issued in the corresponding Application No. PCT/KR2022/011218, mailed Nov. 7, 2022.

Written Opinion of the International Search Authority issued in the corresponding Application No. PCT/ KR2022/011218, mailed Nov. 7, 2022.

Office Action issued in corresponding Japanese Patent Application No. 2024-502649, dated Mar. 11, 2025.

* cited by examiner

[Fig. 1]
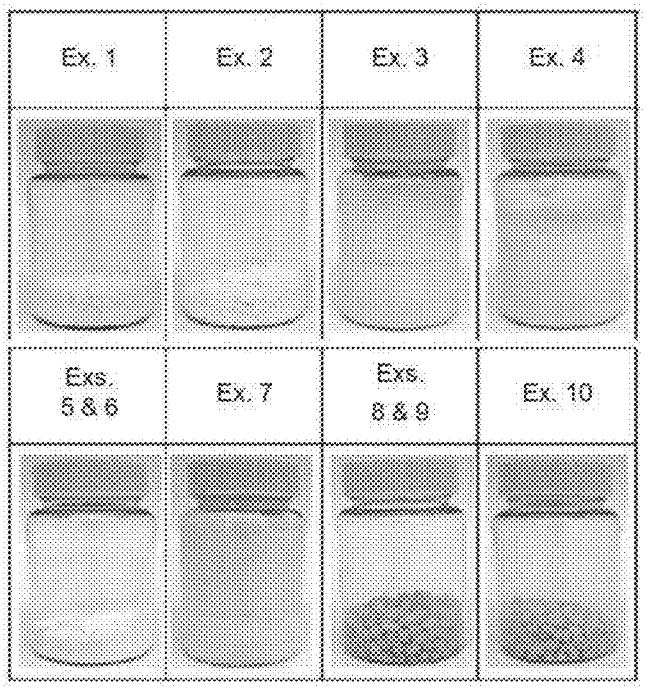
[Fig. 2]
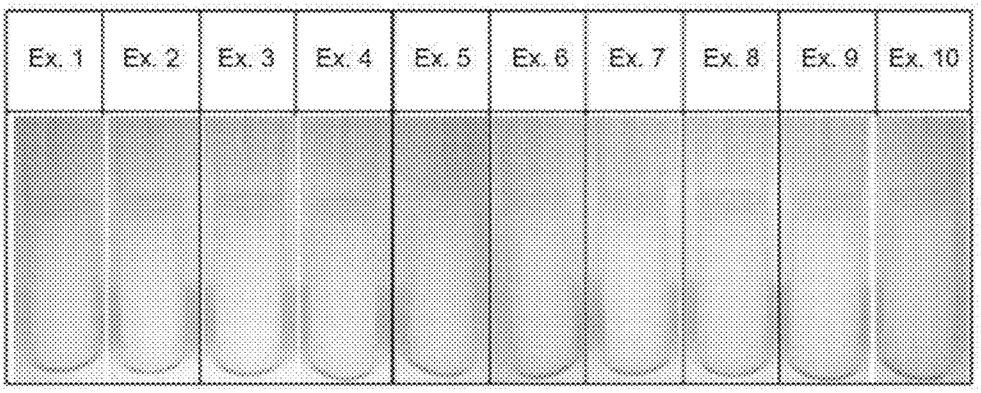

[Fig. 3]
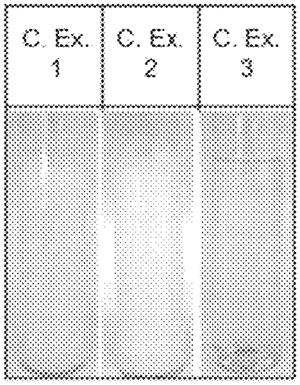
[Fig. 4]
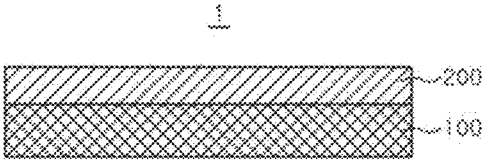
[Fig. 5]
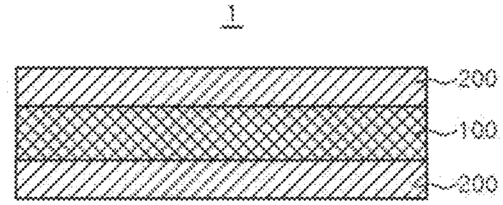

POLYHYDROXYALKANOATE (PHA) DISPERSION AND PREPARATION METHOD THEREFOR

TECHNICAL FIELD

The present invention relates to a polyhydroxyalkanoate (PHA) dispersion and a process for preparing the same.

BACKGROUND ART

In recent years, as concerns about environmental problems have increased, research on the treatment and recycling of various household wastes has been actively conducted. Specifically, although polymer materials, which are inexpensive and have excellent processability, are widely used to manufacture various products such as paper, films, fibers, packaging materials, bottles, and containers, when the lifespan of these products is over, harmful substances may be discharged when they are incinerated, and it takes hundreds of years depending on their types to completely decompose naturally.

Therefore, research on biodegradable polymers continues, which can be decomposed within a short period of time to enhance environmental friendliness, while enhancing mechanical properties, oil resistance, water resistance, and processability, and increasing the lifespan of products themselves, thereby reducing the amount of waste or enhancing their recyclability.

Polyhydroxyalkanoates (PHAs) are biodegradable polymers composed of several types of hydroxyl carboxylic acids produced by numerous microorganisms and used as intracellular storage materials. Polyhydroxyalkanoates have physical properties similar to those of conventional petroleum-derived synthetic polymers such as polybutylene adipate terephthalate (PBAT), polybutylene succinate (PBS), polybutylene succinate terephthalate (PBST), and polybutylene succinate adipate (PBSA), exhibit complete biodegradability, and are excellent in biocompatibility.

Meanwhile, in order to enhance the service lifespan and recyclability of various products such as paper, films, fibers, packaging materials, bottles, containers, and the like, it is important to enhance mechanical properties such as strength, water resistance, and oil resistance. In order to enhance physical properties, a process of forming a coating layer on the surface of a product may be used; however, there is a problem in that biodegradability and recyclability are deteriorated due to the coating layer. Accordingly, there is a need for the development of a biodegradable dispersion that is excellent in dispersibility, coatability, and processability while being environmentally friendly by virtue of excellent biodegradability and biocompatibility, and a process for preparing the same.

PRIOR ART DOCUMENT

Patent Document (Patent Document 1) Korean Laid-open Patent Publication No. 2012-0103158

DETAILED DESCRIPTION OF THE INVENTION

Technical Problem

Accordingly, the present invention aims to provide a polyhydroxyalkanoate (PHA) dispersion capable of enhancing dispersibility, coatability, productivity, and processability while being environmentally friendly by virtue of excellent biodegradability and biocompatibility, and a process for preparing the same.

Solution to the Problem

The polyhydroxyalkanoate (PHA) dispersion according to an embodiment of the present invention comprises polyhydroxyalkanoate (PHA) particles, wherein the average particle diameter of the polyhydroxyalkanoate (PHA) particles is 0.5 μm to 5 μm, and the particle size deviation is within ±0.3 μm.

The process for preparing a polyhydroxyalkanoate (PHA) dispersion according to another embodiment of the present invention comprises dispersing polyhydroxyalkanoate (PHA) in a solvent using a particle dispersion method, a melt dispersion method, or a solvent extraction method, wherein the average particle diameter of the dispersed polyhydroxyalkanoate (PHA) particles is 0.5 μm to 5 μm, and the particle size deviation is within ±0.3 μm.

Advantageous Effects of the Invention

As the process for preparing a polyhydroxyalkanoate (PHA) dispersion according to an embodiment of the present invention comprises dispersing polyhydroxyalkanoate (PHA) in a solvent using a particle dispersion method, a melt dispersion method, or a solvent extraction method, a polyhydroxyalkanoate (PHA) dispersion with excellent dispersibility and processability can be effectively prepared.

Specifically, since a polyhydroxyalkanoate (PHA) dispersion comprising polyhydroxyalkanoate (PHA) particles having an average particle diameter of 0.5 μm to 5 μm and a particle size deviation within ±0.3 μm can be prepared according to the process for preparing a polyhydroxyalkanoate (PHA) dispersion, dispersibility, dispersion stability, and processability can be enhanced.

BRIEF DESCRIPTION OF THE DRAWING

FIG. 1 is a photograph of PHA prepared in step (1) of Examples 1 to 10.

FIG. 2 is a photograph of PHA dispersions prepared in Examples 1 to 10.

FIG. 3 is a photograph of PHA dispersions prepared in Comparative Examples 1 to 3.

FIG. 4 shows a biodegradable article according to an embodiment of the present invention.

FIG. 5 shows a biodegradable article according to another embodiment of the present invention.

EXPLANATION OF REFERENCE NUMERALS

1: biodegradable article
100: substrate
200: biodegradable coating layer

BEST MODE FOR CARRYING OUT THE INVENTION

Hereinafter, the present invention will be described in detail. The present invention is not limited to the disclosures given below, but it may be modified into various forms as long as the gist of the invention is not changed.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

In the present specification, in the case where an element is mentioned to be formed "on" or "under" another element, it means not only that one element is directly formed "on" or "under" another element, but also that one element is indirectly formed on or under another element with other element(s) interposed between them.

Throughout the present specification, the terms first, second, and the like are used to describe various components. But the components should not be limited by the terms. The terms are used only for the purpose of distinguishing one component from another.

In the present specification, the references for "one side" and "the other side" or "on" and "under" of each component are explained based on the drawings. These terms are only for distinguishing components and may be interchanged with each other in actual application.

In addition, for the sake of description, the sizes of individual elements in the appended drawings may be exaggeratedly depicted and do not indicate the actual sizes. In addition, the same reference numerals refer to the same elements throughout the specification.

Polyhydroxyalkanoate (PHA) Dispersion

The polyhydroxyalkanoate (PHA) dispersion according to an embodiment of the present invention comprises polyhydroxyalkanoate (PHA) particles, wherein the average particle diameter of the polyhydroxyalkanoate (PHA) particles is 0.5 μm to 5 μm, and the particle size deviation is within ±0.3 μm.

The polyhydroxyalkanoate (PHA) dispersion may have a solids content of 10% by weight to 60% by weight. For example, the solids content of the PHA dispersion may be 10% by weight to 60% by weight, 15% by weight to 55% by weight, 20% by weight to 55% by weight, 25% by weight to 50% by weight, 30% by weight to 45% by weight, or 35% by weight to 45% by weight.

The polyhydroxyalkanoate (PHA) dispersion may have a viscosity of 100 mPa·s to 1,000 mPa·s. For example, the viscosity of the PHA dispersion may be 100 mPa·s to 1,000 mPa·s, 100 mPa·s to 900 mPa·s, 100 mPa·s to 650 mPa·s, 105 mPa·s to 500 mPa·s, 105 mPa·s to 400 mPa·s, 110 mPa·s to 350 mPa·s, or 115 mPa·s to 315 mPa·s.

The polyhydroxyalkanoate (PHA) dispersion may have a haze of 100% to 400%. For example, the haze of the PHA dispersion may be 100% to 400%, 150% to 380%, 180% to 360%, 200% to 350%, 215% to 345%, 233% to 338%, 235% to 335%, or 236% to 331%.

In addition, the polyhydroxyalkanoate (PHA) dispersion may have an L* of 40 or more, an a* of less than 0.44, and a b* of 6 or less. For example, L* of the PHA dispersion may be 40 or more, 42 or more, 45 or more, 48 or more, 40 to 60, 42 to 58, 45 to 55, or 48 to 55; a* thereof may be less than 0.44, 0.43 or less, 0.42 or less, 0.4 or less, 0.01 to less than 0.44, 0.05 to 0.42, or 0.08 to 0.4; and b* thereof may be 6 or less, 5.8 or less, 5.6 or less, 3 to 6, 3.3 to 5.8, 3.5 to 5.6, or 3.7 to 5.6.

L*, a*, and b* are color coordinates established by the Commission International d'Eclairage (CIE), where color is represented by L (brightness), a (green to red complementary color), and b (yellow to blue complementary color). They may be measured using spectrophotometer CM-5 (manufacturer: Konica Minolta).

The polyhydroxyalkanoate (PHA) dispersion may have a yellow index (Y.I.) of 5 to 20, which may be measured according to the ASTME313 standard. For example, the yellow index (Y.I.) of the PHA dispersion may be 5 to 20, 6 to 18, 7 to 15, 9 to 13, 9.1 to 12.99, or 9.1 to 12.95.

As the haze, color characteristics such as L*, a*, and b*, and yellow index of the PHA dispersion satisfy the above ranges, it has excellent color characteristics and can enhance the anti-yellowing effect.

In addition, the polyhydroxyalkanoate (PHA) dispersion may have a zeta potential of −10 mV or less. For example, the zeta potential of the PHA dispersion may be −10 mV or less, −15 mV or less, −20 mV or less, −25 mV or less, or −30 mV or less, and may be −150 mV or more, −125 mV or more, −100 mV or more, or −80 mV or more. As the zeta potential of the PHA dispersion satisfies the above range, the inter-particle dispersion stability within the PHA dispersion and the dispersibility of the high-content PHA dispersion can be further enhanced.

Zeta potential (or electrokinetic potential) refers to the difference in electric potential between the charge of ions surrounding a particle and the charge of a dispersion. Specifically, there are two types of liquid layer that exists around particles. They are an internal area (stem layer: electron layer) where ions form a strong boundary and an external area (defuse) where they are relatively weakly bonded. The external area (defuse) is an area within a theoretical boundary where ions and particles exist stably. For example, when a particle moves, ions in the internal area move within a predetermined boundary. On the other hand, ions that exist outside the predetermined boundary move independently, like a giant dispersant, regardless of the particles. The potential at this boundary is zeta potential.

The zeta potential may be measured by ZetaPlus Zeta Potential Analyzer (manufacturer: Brookhaven Instruments), Zeta Sizer (manufacturer: Melbourne Instrument), or the like, but it is not limited thereto.

The polyhydroxyalkanoate (PHA) dispersion may have a pH of 3 to 11 or 4 to 10.

In addition, the polyhydroxyalkanoate (PHA) dispersion may have a light transmittance of 10% to 99%. For example, the light transmittance of the PHA dispersion may be that of a biodegradable coating layer formed from the PHA dispersion, which may be 10% to 99%, 10% to 90%, 15% to 95%, 20% to 90%, or 25% to 85%.

Polyhydroxyalkanoate (PHA)

Polyhydroxyalkanoate (PHA) has physical properties similar to those of conventional petroleum-derived synthetic polymers such as polybutylene adipate terephthalate (PBAT), polybutylene succinate (PBS), polybutylene succinate terephthalate (PBST), and polybutylene succinate adipate (PBSA), exhibits complete biodegradability, and is excellent in biocompatibility.

Specifically, the PHA is a natural thermoplastic polyester polymer that accumulates in microbial cells. Since it is a biodegradable material, it can be composted and finally decomposed into carbon dioxide, water, and organic waste without generating toxic waste.

In particular, since PHA is biodegradable even in soil and sea, a dispersion comprising the same and a biodegradable article prepared using the same may have environmentally friendly characteristics. Thus, a dispersion comprising PHA and a biodegradable article prepared using the same have a great advantage in that they can be used in various fields since they are biodegradable and environmentally friendly.

As the polyhydroxyalkanoate (PHA) dispersion according to an embodiment of the present invention comprises polyhydroxyalkanoate (PHA) particles, biodegradability can be enhanced without deterioration of mechanical properties.

The PHA may be formed by enzyme-catalyzed polymerization of one or more monomer repeat units in living cells.

The PHA may be a polyhydroxyalkanoate (PHA) copolymer (hereinafter, referred to as a PHA copolymer), specifically, a copolymer in which different repeat units are randomly distributed in the polymer chain.

Examples of repeat units that may be contained in the PHA include 2-hydroxybutyrate, lactic acid, glycolic acid, 3-hydroxybutyrate (hereinafter, referred to as 3-HB), 3-hydroxypropionate (hereinafter, referred to as 3-HP), 3-hydroxyvalerate (hereinafter, referred to as 3-HV), 3-hydroxyhexanoate (hereinafter, referred to as 3-1H), 3-hydroxyheptanoate (hereinafter, referred to as 3-HHep), 3-hydroxyoctanoate (hereinafter, referred to as 3-HO), 3-hydroxynonanoate (hereinafter, referred to as 3-HN), 3-hydroxydecanoate (hereinafter, referred to as 3-HD), 3-hydroxydodecanoate (hereinafter, referred to as 3-HDd), 4-hydroxybutyrate (hereinafter, referred to as 4-HB), 4-hydroxyvalerate (hereinafter, referred to as 4-HV), 5-hydroxyvalerate (hereinafter, referred to as 5-HV), and 6-hydroxyhexanoate (hereinafter, referred to as 6-HH). The PHA may comprise one or more repeat units selected from the above.

Specifically, the PHA may comprise one or more repeat units selected from the group consisting of 3-HB, 4-HB, 3-HP, 3-HH, 3-HV, 4-LV, 5-HV, and 6-HH.

More specifically, the PHA may comprise a 4-HB repeat unit. That is, the PHA may be a PHA copolymer containing a 4-HB repeat unit.

In addition, the PHA may comprise isomers. For example, the PHA may comprise structural isomers, enantiomers, or geometric isomers. Specifically, the PHA may comprise structural isomers.

In addition, the PHA may be a PHA copolymer that comprises a 4-LHB repeat unit and further comprises one repeat unit different from the 4-HB repeat unit, or two, three, four, five, six, or more repeat units different from each other. For example, the PHA may be poly-3-hydroxybutyrate-co-4-hydroxybutyrate (hereinafter, referred to as 3HB-co-4HB).

According to an embodiment of the present invention, it is important to adjust the content of the 4-HB repeat unit contained in the PHA copolymer.

Specifically, in order to implement the physical properties desired in the present invention, in particular, in order to increase the biodegradability in soil and sea and to achieve excellent dispersibility, dispersion stability, storage stability, coatability, water resistance, processability, and productivity without deterioration of mechanical properties, it is very important to adjust the content of the 4-HB repeat unit contained in the PHA copolymer.

More specifically, the PHA copolymer may comprise a 4-HB repeat unit in an amount of 0.1% by weight to 60% by weight based on the total weight of the PHA copolymer. For example, the content of a 4-HB repeat unit may be 0.1% by weight to 60% by weight, 0.1% by weight to 55% by weight, 0.5% by weight to 60% by weight, 0.5% by weight to 55% by weight, 1% by weight to 60% by weight, 1% by weight to 55% by weight, 1% by weight to 50% by weight, 2% by weight to 55% by weight, 3% by weight to 55% by weight, 3% by weight to 50% by weight, 5% by weight to 55% by weight, 5% by weight to 50% by weight, 10% by weight to 55% by weight, 10% by weight to 50% by weight, 1% by weight to 40% by weight, 1% by weight to 30% by weight, 1% by weight to 29% by weight, 1% by weight to 25% by weight, 1% by weight to 24% by weight, 2% by weight to 20% by weight, 2% by weight to 23% by weight, 3% by weight to 20% by weight, 3% by weight to 15% by weight, 4% by weight to 18% by weight, 5% by weight to 15% by weight, 8% by weight to 12% by weight, 9% by weight to 12% by weight, 15% by weight to 55% by weight, 15% by weight to 50% by weight, 20% by weight to 55% by weight, 20% by weight to 50% by weight, 25% by weight to 55% by weight, 25% by weight to 50% by weight, 35% by weight to 60% by weight, 40% by weight to 55% by weight, or 45% by weight to 55% by weight, based on the total weight of the PHA copolymer.

As the content of a 4-HB repeat unit satisfies the above range, it is possible to increase the biodegradability in soil and sea and to further enhance such characteristics as dispersibility, dispersion stability, storage stability, coatability, processability, and productivity without deterioration of mechanical properties.

According to an embodiment of the present invention, the PHA may be a PHA copolymer whose crystallinity is adjusted. Specifically, the PHA comprises one or more of a 4-HB repeat unit, and the content of the 4-HB repeat unit may be controlled to adjust the crystallinity of the PHA.

In addition, the PHA may be a polyhydroxyalkanoate (PHA) copolymer that comprises at least one repeat unit selected from the group consisting of 3-hydroxybutyrate (3-HB), 4-hydroxybutyrate (4-HB), 3-hydroxypropionate (3-HP), 3-hydroxyhexanoate (3-HH), 3-hydroxyvalerate (3-HV), 4-hydroxyvalerate (4-HV), 5-hydroxyvalerate (5-HV), and 6-hydroxyhexanoate (6-HH).

Specifically, the PHA copolymer may comprise a 4-HB repeat unit and further comprises one or more repeat units selected from the group consisting of a 3-HB repeat unit, a 3-HP repeat unit, a 3-HH repeat unit, a 3-HV repeat unit, a 4-HV repeat unit, a 5-HV repeat unit, and a 6-HH repeat unit. More specifically, the PHA copolymer may comprise a 4-HB repeat unit and a 3-HB repeat unit.

For example, the PHA copolymer may comprise a 3-HB repeat unit in an amount of 20% by weight or more, 35% by weight or more, 40% by weight or more, 50% by weight or more, 60% by weight or more, 70% by weight or more, or 75% by weight or more, and 99% by weight or less, 98% by weight or less, 97% by weight or less, 96% by weight or less, 95% by weight or less, 93% by weight or less, 91% by weight or less, 90% by weight or less, 80% by weight or less, 70% by weight or less, 60% by weight or less, or 55% by weight or less, based on the total weight of the PHA copolymer.

The PHA whose crystallinity is adjusted may be one in which its crystallinity and amorphousness are adjusted as the irregularities are increased in its molecular structure. Specifically, the types or ratios of the monomers or the types or contents of the isomers may be adjusted.

According to an embodiment of the present invention, the PHA may comprise two or more types of PHA having different crystallinities. Specifically, the PHA may be prepared by mixing two or more types of PHA having different crystallinities to have the content of a 4-HB repeat unit in the specific range.

Specifically, the PHA may comprise a first PHA that is a semi-crystalline PHA.

As a semi-crystalline PHA (hereinafter, referred to as scPHA) with controlled crystallinity, the first PHA may comprise a 4-BI repeat unit in an amount of 0.1% by weight to 30% by weight. For example, the first PHA may comprise a 4-BI repeat unit in an amount of 0.1% by weight to 30% by weight, 0.5% by weight to 30% by weight, 1% by weight to 30% by weight, 3% by weight to 30% by weight, 1% by weight to 28% by weight, 1% by weight to 25% by weight, 1% by weight to 24% by weight, 1% by weight to 15% by weight, 2% by weight to 25% by weight, 3% by weight to 25% by weight, 3% by weight to 24% by weight, 5% by weight to 24% by weight, 7% by weight to 20% by weight, 10% by weight to 20% by weight, 15% by weight to 25% by weight, or 15% by weight to 24% by weight.

The glass transition temperature (Tg) of the first PHA may be −30° C. to 80° C., −30° C. to 10° C., −25° C. to 5° C., −25° C. to 0° C., −20° C. to 0° C., or −15° C. to 0° C. The crystallization temperature (Tc) of the first PIA may be 70° C. to 120° C., 75° C. to 120° C., or 75° C. to 115° C. The melting temperature (Tm) of the first PHA may be 105° C. to 165° C., 110° C. to 160° C., 115° C. to 155° C., or 120° C. to 150° C.

The first PHA may have a weight average molecular weight of 10,000 g/mole to 1,200,000 g/mole, 50,000 g/mole to 1,100,000 g/mole, 100,000 g/mole to 1,000,000 g/mole, 100,000 g/mole to 900,000 g/mole, 200,000 g/mole to 800,000 g/mole, 200,000 g/mole to 600,000 g/mole, or 200,000 g/mole to 400,000 g/mole.

In addition, the PHA may comprise a second PHA, which is an amorphous PHA resin with controlled crystallinity.

As an amorphous PHA (hereinafter, referred to as aPHA) with controlled crystallinity, the second PHA may comprise a 4-FIB repeat unit in an amount of 15% by weight to 60% by weight, 15% by weight to 55% by weight, 20% by weight to 55% by weight, 25% by weight to 55% by weight, 30% by weight to 55% by weight, 35% by weight to 55% by weight, 20% by weight to 50% by weight, 25% by weight to 50% by weight, 30% by weight to 50% by weight, 35% by weight to 50% by weight, or 20% by weight to 40% by weight.

The glass transition temperature (Tg) of the second PHA may be −45° C. to −10° C., −35° C. to −15° C., −35° C. to −20° C., or −30° C. to −20° C.

In addition, the crystallization temperature (Tc) of the second PHA may not be measured or may be 60° C. to 120° C., 60° C. to 110° C., 70° C. to 120° C., or 75° C. to 115° C. The melting temperature (Tm) of the second PHA may not be measured or may be 100° C. to 170° C., 100° C. to 160° C., 110° C. to 160° C., or 120° C. to 150° C.

The second PHA resin may have a weight average molecular weight of 10,000 g/mole to 1,200,000 g/mole, 10,000 g/mole to 1,000,000 g/mole, 50,000 g/mole to 1,000,000 g/mole, 200,000 g/mole to 1,200,000 g/mole, 300,000 g/mole to 1,000,000 g/mole, 100,000 g/mole to 900,000 g/mole, 500,000 g/mole to 900,000 g/mole, 200,000 g/mole to 800,000 g/mole, or 200,000 g/mole to 400,000 g/mole.

The first PHA and the second PHA may be distinguished in terms of the content of a 4-HB repeat unit and may have at least one characteristic selected from the group consisting of the above glass transition temperature (Tg), crystallization temperature (Tc), and melting temperature (Tm). Specifically, the first PHA and the second PHA may be distinguished in terms of the content of a 4-HB repeat unit, glass transition temperature (Tg), crystallization temperature (Tg), melting temperature (Tm), and the like.

According to an embodiment of the present invention, the PHA may comprise the first PHA, or it may comprise both the first PHA and the second PHA.

Specifically, as the PHA comprises the first PHA, which is a semi-crystalline PHA, or both the first PHA, which is a semi-crystalline PHA, and the second PHA, which is an amorphous PHA, more specifically, as the contents of the first PHA and the second PHA are adjusted, it is possible to further enhance dispersibility, dispersion stability, storage stability, coatability, and processability.

In addition, the glass transition temperature (Tg) of the PHA may be −45° C. to 80° C., −35° C. to 80° C., −30° C. to 80° C., −25° C. to 75° C., −20° C. to 70° C., −35° C. to 5° C., −25° C. to 5° C., −35° C. to 0° C., −25° C. to 0° C., −30° C. to −10° C., −35° C. to −15° C., −35° C. to −20° C., −20° C. to 0° C., −15° C. to 0° C., or −15° C. to -5° C.

The crystallization temperature (Tc) of the PHA may not be measured or may be 60° C. 20 to 120° C., 60° C. to 110° C., 70° C. to 120° C., 75° C. to 120° C., 75° C. to 115° C., 75° C. to 110° C., or 90° C. to 110° C.

The melting temperature (Tm) of the PHA may not be measured or may be 100° C. to 170° C., 105° C. to 170° C., 105° C. to 165° C., 110° C. to 160° C., 115° C. to 155° C., 110° C. to 150° C., 120° C. to 150° C., or 120° C. to 140° C.

In addition, the PHA may have a weight average molecular weight of 10,000 g/mole to 1,200,000 g/mole. For example, the weight average molecular weight of the PHA resin may be 50,000 g/mole to 1,200,000 g/mole, 100,000 g/mole to 1,200,000 g/mole, 50,000 g/mole to 1,000,000 g/mole, 100,000 g/mole to 1,000,000 g/mole, 200,000 g/mole to 1,200,000 g/mole, 250,000 g/mole to 1,150,000 g/mole, 300,000 g/mole to 1,100,000 g/mole, 350,000 g/mole to 1,000,000 g/mole, 350,000 g/mole to 950,000 g/mole, 100,000 g/mole to 900,000 g/mole, 200,000 g/mole to 800,000 g/mole, 200,000 g/mole to 700,000 g/mole, 250,000 g/mole to 650,000 g/mole, 200,000 g/mole to 400,000 g/mole, 300,000 g/mole to 800,000 g/mole, 300,000 g/mole to 600,000 g/mole, 500,000 g/mole to 1,200,000 g/mole, 500,000 g/mole to 1,000,000 g/mole 550,000 g/mole to 1,050,000 g/mole, 550,000 g/mole to 900,000 g/mole, 600,000 g/mole to 900,000 g/mole, or 500,000 g/mole to 900,000 g/mole.

The PHA may have a crystallinity of 90% or less as measured by a differential scanning calorimeter (DSC). For example, the crystallinity of the PHA may be measured by differential scanning calorimetry and may be 90% or less, 85% or less, 80% or less, 75% or less, or 70% or less.

According to an embodiment of the present invention, the PHA dispersion comprises PHA particles. Specifically, the PHA dispersion may comprise PHA particles obtained from the PHA.

The PHA particles may have an average particle diameter of 0.5 μm to 5 μm. For example, the average particle diameter of the PHA particles may be 0.5 μm to 5 μm, 0.5 μm to 4.5 μm, 0.7 μm to 4 μm, 1 μm to 3.5 μm, or 1.2 μm to 3.5 μm.

In addition, the PHA particles may have a particle size deviation within 0.3 μm. For example, the particle size deviation of the PHA particles may be within +0.2 μm, within +0.15 μm, within ±0.1 μm, or within ±0.05 μm.

The average particle diameter and particle size deviation of the PHA particles may be measured with a nano particle size analyzer (e.g., Zetasizer Nano ZS). Specifically, the PHA particles are subjected to measurement of average particle diameter and particle size deviation through dynamic light scattering (DLS) at a temperature of 25° C. and a measurement angle of 175° using Zetasizer Nano ZS (manufacturer: Marven). Here, the value of the peak derived through the polydispersity index (PDI) in the confidence interval of 0.5 is taken as the particle size.

The PHA may have a polydispersity index (PDI) of less than 3. For example, the polydispersity index of the PHA may be less than 3, 2.8 or less, 2.5 or less, less than 2.5, 2.1 or less, or 2 or less.

As the average particle diameter, particle size deviation, and polydispersity index of the PHA satisfy the above ranges, dispersibility, dispersion stability, storage stability, coatability, and processability can be further enhanced.

In addition, the PHA may be obtained by cell disruption using a mechanical or physical method, or may be obtained by cell disruption using a non-mechanical or chemical method. Specifically, since the PHA is a natural thermoplastic polyester polymer that accumulates in microbial cells and has a relatively large average particle diameter, it may be obtained through a disruption process in order to enhance dispersibility, coatability, and processability.

According to another embodiment of the present invention, the PHA dispersion may further comprise a biodegradable polymer.

Specifically, the biodegradable polymer may comprise at least one selected from the group consisting of polylactic acid (PLA), polybutylene adipate terephthalate (PBAT), polybutylene succinate (PBS), thermoplastic starch (TPS), polybutylene succinate terephthalate (PBST), polyethylene terephthalate (PET), polybutylene succinate adipate (PBSA), polybutylene adipate (PBA), polypropylene (PP), polyethylene (PE), and polycaprolactone (PCL). As the PHA dispersion further comprises the biodegradable polymer, it may be more advantageous for controlling characteristics such as mechanical properties.

According to another embodiment of the present invention, the PHA dispersion may comprise a surfactant. As the PHA dispersion comprises a surfactant, dispersibility, dispersion stability, storage stability, coatability, and processability can be further enhanced.

Specifically, the surfactant may be at least one selected from the group consisting of cationic surfactants, anionic surfactants, phosphoric acid-based surfactants, fatty acid-based surfactants, acrylic-based surfactants, urethane-based surfactants, epoxy-based surfactants, and nonionic surfactants, or a polymeric surfactant comprising at least one selected from the group consisting of carboxylic acids, amines, isocyanates, and derivatives thereof.

For example, the surfactant may be at least one selected from the group consisting of polyvinyl alcohol, sodium dodecylbenzene sulfonate, polyvinylpyrrolidone, methyl polyethylene alkyl ether, alkyl benzene sulfonate, nonylphenol ether sulfate, sodium lauryl sulfate, lithium dodecyl sulfate, alkyl phosphate, glyceryl esters, and polypropylene glycol esters.

The PHA dispersion may comprise the surfactant in an amount of 0.01% by weight to 10% by weight based on the total weight of the PHA dispersion on the basis of solids content. For example, the content of the surfactant may be 0.01% by weight to 10% by weight, 0.01% by weight to 8% by weight, 0.05% by weight to 5% by weight, 0.07% by weight to 3.5% by weight, 0.1% by weight to 5% by weight, 1% by weight to 5% by weight, 1.5% by weight to 5% by weight, 0.1% by weight to 2.5% by weight, or 0.01% by weight to 3% by weight, based on the total weight of the PHA dispersion on the basis of solids content.

Although the PHA dispersion comprises a smaller amount of surfactant than the conventional one, it has excellent dispersibility, dispersion stability, storage stability, coatability, and processability.

The PHA dispersion may further comprise at least one additive selected from the group consisting of rheology modifiers, antioxidants, stabilizers, antibacterial agents, antifoaming agents, preservatives, and pH adjusting agents.

The rheology modifier may be at least one selected from the group consisting of gum, clay mineral, cellulose derivatives, cellulose-based modifiers, acrylic-based modifiers, and urethane-based modifiers. For example, the rheology modifier may be one of gum, clay mineral, or cellulose-based modifier, or may be a mixture of two types, such as gum and clay mineral or gum and cellulose-based modifier.

The gum may be at least one selected from the group consisting of xanthan gum, guar gum, gellan gum, locust gum, Arabic gum, carrageenan, karaya gum, gati gum, tara gum, tamarind gum, and tragacanth gum. The clay mineral may be at least one selected from the group consisting of bentonite, smectite, etherpulgite, montmorillonite, kaolinite, sericite, and illite.

The cellulose derivative may be at least one selected from the group consisting of casein, sodium caseinate, and sodium alginate. The cellulose-based modifier may be at least one selected from the group consisting of methyl cellulose, hydroxypropyl cellulose, and methylhydroxypropyl cellulose.

In addition, the rheology modifier may have a branched, linear, plate-like, irregular, spherical, or rod-like shape. As the rheology modifier has the above shape, coatability, processability, and productivity can be further enhanced.

The rheology modifier may be employed in an amount of 0.01% by weight to 20% by weight, 0.01% by weight to 15% by weight, 0.01% by weight to 12% by weight, 0.01% by weight to 10% by weight, 0.01% by weight to 8% by weight, 0.01% by weight to 5% by weight, 0.01% by weight to 4% by weight, 0.01% by weight to 3% by weight, 0.02% by weight to 2% by weight, 0.02% by weight to 1.5% by weight, or 0.03% by weight to 1% by weight, based on the total weight of the PHA dispersion on the basis of solids content.

The antioxidant is an additive for preventing decomposition by ozone or oxygen, preventing oxidation during storage, and preventing deterioration of physical properties. Any commonly used antioxidant may be used as long as the effect of the present invention is not impaired.

Specifically, the antioxidant may comprise at least one selected from the group consisting of hindered phenol-based antioxidants and phosphite-based (phosphorus-based) antioxidants.

For example, the hindered phenol-based antioxidant may comprise, for example, at least one selected from the group consisting of 4,4'-methylene-bis(2,6-di-t-butylphenol), octadecyl-3-(3,5-di-t-butyl-4-hydroxyphenyl)propionate, pentaerythritol tetrakis[3-(3,5-di-t-butyl-4-hydroxyphenyl)propionate), and 3,9-bis[2-[3-(3-tert-butyl-4-hydroxy-5-methylphenyl)propionyloxy]-1,1-dimethylethyl]-2,4,8,10-tetraoxaspiro[5.5]undecane.

In addition, the phosphite-based (phosphorus-based) antioxidant may comprise, for example, at least one selected from the group consisting of tris-(2,4-di-t-butylphenyl)phosphite, bis-(2,4-di-t-butylphenyl)pentaerythritol-diphosphite, bis-(2,6-di-t-butyl-4-methylphenyl)pentaerythritol-diphosphite, distearyl-pentaerythritol-diphosphite, [bis(2,4-di-t-butyl-5-methylphenoxy)phosphino]biphenyl, and N,N-bis[2-[[2,4,8,10-tetrakis(1,1-dimethylethyl)dibenzo[d,f][1,3,2]dioxyphosphepin-6-yl]oxy]-ethyl]ethanamine.

The antioxidant may be employed in an amount of 0.01% by weight to 20% by weight, 0.01% by weight to 15% by weight, 0.01% by weight to 12% by weight, 0.01% by weight to 10% by weight, 0.01% by weight to 8% by weight, 0.01% by weight to 5% by weight, 0.2% by weight to 4.5% by weight, 0.2% by weight to 4% by weight, or 0.5% by weight to 3% by weight, based on the total weight of the PHA dispersion on the basis of solids content.

The stabilizer is an additive for protecting against oxidation and heat and preventing color change. Any commonly used stabilizer may be used as the stabilizer as long as the effect of the present invention is not impaired.

Specifically, the stabilizer may be at least one selected from the group consisting of trimethyl phosphate, triphenyl phosphate, trimethyl phosphine, phosphoric acid, and phosphorous acid.

The stabilizer may be employed in an amount of 0.01% by weight to 20% by weight, 0.01% by weight to 15% by weight, 0.01% by weight to 12% by weight, 0.01% by weight to 10% by weight, 0.01% by weight to 8% by weight, 0.01% by weight to 5% by weight, 0.2% by weight to 4.5% by weight, 0.2% by weight to 4% by weight, or 0.5% by weight to 3% by weight, based on the total weight of the PHA dispersion on the basis of solids content.

The antibacterial agent may be at least one natural antibacterial agent selected from the group consisting of organic acids, bacteriocins, and calcium agents or colloids, or compounds containing elements such as silver. It may be at least one selected from the group consisting of polylysine, benzisothiazolinone, vinegar powder, chitooligosaccharide, hydrogen peroxide, ethylenediaminetetraacetic acid, potassium sorbate, sorbic acid, propionic acid, potassium propionate, sodium benzoate, 1,2-hexanediol, and 1,2-octanediol.

The antibacterial agent may be employed in an amount of 0.01% by weight to 5% by weight, 0.01% by weight to 3% by weight, 0.01% by weight to 1% by weight, 0.1% by weight to 1% by weight, 0.2% by weight to 1% by weight, or 0.3% by weight to 1% by weight, based on the total weight of the PHA dispersion on the basis of solids content.

In addition, the antifoaming agent is an additive for preventing or reducing foaming. Any commonly used antifoaming agent may be used as the antifoaming agent as long as the effect of the present invention is not impaired.

For example, the antifoaming agent may be at least one selected from the group consisting of an alcohol-based antifoaming agent, a polar compound-based antifoaming agent, an inorganic particle-based antifoaming agent, and a silicone-based antifoaming agent, or may be at least one selected from the group consisting of ethyl alcohol, 2-ethylhexanol, polysiloxane, dimethylpolysiloxane, silicone paste, silicone emulsion, silicone treatment powder, fluorosilicone, distearic acid, ethylene glycol, and natural wax.

The antifoaming agent may be employed in an amount of 0.0001% by weight to 5% by weight, 0.0001% by weight to 3% by weight, 0.0001% by weight to 1% by weight, 0.001% by weight to 1% by weight, or 0.001% by weight to 0.5% by weight, based on the total weight of the PHA dispersion on the basis of solids content.

In addition, the preservative may be at least one natural preservative selected from the group consisting of hydroxyacetophenone, *Centella asiatica* extract, 1,2-hexanediol, and 1,3-butanediol, and may be at least one preservative selected from the group consisting of 1,2-benzisothiazolin-3-one and potassium benzoate, but it is not limited thereto.

The preservative may be employed in an amount of 0.01% by weight to 20% by weight, 0.01% by weight to 15% by weight, 0.01% by weight to 12% by weight, 0.01% by weight to 10% by weight, 0.01% by weight to 8% by weight, 0.01% by weight to 5% by weight, 0.2% by weight to 4.5% by weight, 0.2% by weight to 4% by weight, or 0.5% by weight to 3% by weight, based on the total weight of the PHA dispersion on the basis of solids content.

In addition, the pH adjusting agent refers to a material that is added to a solution to adjust the pH. It may comprise both a pH reducing agent for decreasing the pH and a pH increasing agent for increasing the pH. Specifically, the pH reducing agent may be a strongly acidic substance such as sulfuric acid and hydrochloric acid or an aqueous ammonium salt solution, and the pH increasing agent may be a basic substance such as ammonia water, sodium hydroxide, lithium hydroxide, and potassium hydroxide, or an aqueous acetate salt solution, but it is not limited thereto.

For example, the pH increasing agent may be at least one selected from the group consisting of acetic acid, lactic acid, hydrochloric acid, phosphoric acid, sodium hydroxide, citric acid, malic acid, fumaric acid, potassium phosphate, sodium bicarbonate, and sodium phosphate.

The pH adjusting agent may be employed in an amount of 0.01% by weight to 20% by weight, 0.01% by weight to 15% by weight, 0.01% by weight to 12% by weight, 0.01% by weight to 10% by weight, 0.01% by weight to 8% by weight, 0.01% by weight to 5% by weight, 0.2% by weight to 4.5% by weight, 0.2% by weight to 4% by weight, or 0.5% by weight to 3% by weight, based on the total weight of the PHA dispersion on the basis of solids content.

Process for Preparing a Polyhydroxyalkanoate (PHA) Dispersion

The process for preparing a polyhydroxyalkanoate (PHA) dispersion according to another embodiment of the present invention comprises dispersing polyhydroxyalkanoate (PHA) in a solvent using a particle dispersion method, a melt dispersion method, or a solvent extraction method, wherein the average particle diameter of the dispersed polyhydroxyalkanoate (PHA) particles is 0.5 μm to 5 μm, and the particle size deviation is within ±0.3 μm.

The polyhydroxyalkanoate (PHA) may be obtained by cell disruption using a mechanical or physical method. Alternatively, the PHA may be obtained by cell disruption using a non-mechanical or chemical method.

The average particle diameter of the disrupted PHA in the cell disruption using a mechanical or physical method is larger than that in the cell disruption using a non-mechanical or chemical method; thus, the dispersibility is lower. However, the process for preparing a PHA dispersion according to the present invention can have excellent dispersibility even when cells are disrupted using a mechanical or physical method.

In addition, the process for preparing a polyhydroxyalkanoate (PHA) dispersion may be carried out with at least one device selected from the group consisting of an agitator, a homogenizer, a high-pressure homogenizer, a microfluidizer, and a colloid mill, or by at least one method selected from the group consisting of high shear, ultrasonicator, and membrane emulsification.

Particle Dispersion Method

The process for preparing a polyhydroxyalkanoate (PHA) dispersion according to another embodiment of the present invention may comprise (1-1) preparing the polyhydroxyalkanoate (PHA) obtained by cell disruption using a physical or chemical method; and (1-2) dispersing the polyhydroxyalkanoate (PHA) in a solvent using a particle dispersion method.

First, the polyhydroxyalkanoate (PHA) obtained by cell disruption using a physical or chemical method may be prepared (step (1-1)).

Details on the cell disruption and PHA are as described above.

In addition, the PHA prepared in step (1-1) may be in the form of fine particles.

Specifically, the PHA obtained by cell disruption using a mechanical or chemical method in step (1-1) may be a powder in the form of fine particles.

Thereafter, the polyhydroxyalkanoate (PHA) may be dispersed in a solvent using a particle dispersion method (step (1-2)).

Specifically, step (1-2) may comprise adding the surfactant to the PHA prepared in step (1-1). For example, step (1-2) may comprise adding the surfactant in an amount of 0.01% by weight to 10% by weight, 0.01% by weight to 8% by weight, 0.05% by weight to 5% by weight, 0.07% by weight to 3.5% by weight, 0.1% by weight to 5% by weight, 1% by weight to 5% by weight, 1.5% by weight to 5% by weight, 0.1% by weight to 2.5% by weight, or 0.01% by weight to 3% by weight, based on the total weight of the PHA dispersion on the basis of solids content.

The surfactant may be at least one selected from the group consisting of cationic surfactants, anionic surfactants, phosphoric acid-based surfactants, fatty acid-based surfactants, acrylic-based surfactants, urethane-based surfactants, epoxy-based surfactants, and nonionic surfactants, or a polymeric surfactant comprising at least one selected from the group consisting of carboxylic acids, amines, isocyanates, and derivatives thereof.

For example, the surfactant may be at least one selected from the group consisting of polyvinyl alcohol, sodium dodecylbenzene sulfonate, polyvinylpyrrolidone, methyl polyethylene alkyl ether, alkyl benzene sulfonate, nonylphenol ether sulfate, sodium lauryl sulfate, lithium dodecyl sulfate, alkyl phosphate, glyceryl esters, and polypropylene glycol esters. In the particle dispersion method, a polyvinyl alcohol surfactant may be preferable since it has high solubility, has a fast reaction rate, can reduce harmfulness, and can enhance productivity and processability, but it is not limited thereto.

In addition, the dispersion step may be carried out by high-speed dispersion treatment for 20 minutes to 60 minutes using a homogenizer at a rate of 60% to 80% of the maximum rotational speed per minute (rpm). For example, the dispersion step may be carried out by high-speed dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

Alternatively, the dispersion step may be carried out by ultrasonic treatment for 1 hour or less at an energy level of 20 Hz or more. For example, the dispersion step may be carried out by ultrasonic treatment for 1 hour or less, 55 minutes or less, 50 minutes or less, or 45 minutes or less, or 5 minutes or more, 10 minutes or more, 15 minutes or more, or 20 minutes or more, at an energy level of 20 Hz or more, 25 Hz or more, 30 Hz or more, 40 Hz or more, or 50 Hz or more.

As the dispersion step is carried out under the above conditions, dispersibility, dispersion stability, storage stability, coatability, and processability can be further enhanced.

According to another embodiment of the present invention, the dispersion step may comprise carrying out a first dispersion treatment; and carrying out a second dispersion treatment.

Specifically, the dispersion step may be carried out by filtering, washing, and second dispersion treatment of the first aqueous dispersion that has been subjected to the first dispersion treatment.

More specifically, in the dispersion step, the PHA obtained in step (1-1) by cell disruption using a physical method, a mixture of the PHA and a surfactant, or a mixture of the PHA, a surfactant, and a solvent may be subjected to a first dispersion treatment to produce a first aqueous dispersion; and the first aqueous dispersion may be filtered and washed, and a solvent is additionally added thereto, and a second dispersion treatment is carried out to prepare a PHA dispersion.

The filtration step may be carried out using a filter medium such as paper, a woven fabric, a nonwoven fabric, a screen, a polymer membrane, or a wedge wire, and may be carried out using a suction filter, a pressure filter, a membrane separator, a vacuum filter, a reduced-pressure vacuum filter, an industrial filter press, a tube press, a plate press, a gauge press, a belt press, a screw press, a disk press, a pressurizing function press, or a centrifuge.

The washing step may be carried out using a solvent. Specifically, the solvent used in the washing step may be water, distilled water, or a hydrophilic solvent, or a mixture of water, distilled water, and a hydrophilic solvent. For example, the hydrophilic solvent may be at least one selected from the group consisting of methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

In addition, the solvent added to the first aqueous dispersion that has been filtered and washed may be water, distilled water, or a hydrophilic solvent. For example, the solvent added to the first aqueous dispersion may be the same as the solvent used in the washing step.

The first and second dispersion steps may be carried out by dispersion treatment for 20 minutes to 60 minutes using a homogenizer at a rate of 60% to 80% of the maximum rotational speed per minute (rpm). For example, the first and second dispersion steps may each be carried out by dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

In addition, the dispersion step may be carried out by dispersing PHA obtained by cell disruption using a chemical method. Specifically, in the dispersion step, the PHA obtained in step (1-1) by cell disruption using a chemical method, a mixture of the PHA and a surfactant, or a mixture of the PHA, a surfactant, and a solvent may be subjected to dispersion treatment to prepare a PHA dispersion.

More specifically, since the average particle diameter of the disrupted PHA in the cell disruption using a mechanical or physical method is larger than the average particle diameter of the disrupted PHA in the cell disruption using a non-mechanical or chemical method, whereby the dispersibility is lower, it may be preferable to further carry out filtration, washing, and a second dispersion treatment. However, since the average particle diameter of PHA obtained in step (1-1) by cell disruption using a non-mechanical or chemical method is relatively small, whereby the dispersibility is higher, filtration, washing, and a second dispersion step may be optionally carried out.

Melt Dispersion Method

The process for preparing a polyhydroxyalkanoate (PHA) dispersion according to another embodiment of the present invention may comprise (2-1) preparing polyhydroxyalkanoate (PHA); and (2-2) dispersing the polyhydroxyalkanoate (PHA) in a solvent using a melt dispersion method.

First, polyhydroxyalkanoate (PHA) may be prepared (step (2-1)).

Details on the PHA are as described above.

In the melt dispersion method, unlike the particle dispersion method, the PHA prepared in step (2-1) may not be PHA obtained by cell disruption using a non-mechanical or chemical method. Specifically, since the melt dispersion method comprises melting PHA, dispersibility can be further enhanced even if PHA obtained by cell disruption using a mechanical or physical method to have an average particle diameter relatively larger than that of PHA obtained by cell disruption using a non-mechanical or chemical method is used.

For example, even if the PITA obtained in step (2-1) by cell disruption using a mechanical or physical method is in a form with a large average particle diameter, such as granules or pellets, the dispersibility can be further enhanced.

Thereafter, the polyhydroxyalkanoate (PHA) may be dispersed in a solvent using a melt dispersion method (step (2-2)).

Specifically, the dispersion step comprises melting the polyhydroxyalkanoate (PHA); mixing the molten polyhydroxyalkanoate with a surfactant; and dispersing it at high pressure in a solvent.

More specifically, the PHA prepared in step (2-1) may be melted, the melt or a mixture of the melt and a surfactant may be subjected to a first dispersion treatment to produce a first aqueous dispersion, and the first aqueous dispersion may be subjected to a second dispersion treatment at high pressure in a solvent to prepare a PHA dispersion.

The melting step may be carried out at 100° C. to 220° C. For example, the melting step may be carried out at 100° C. to 220° C., 110° C. to 200° C., 120° C. to 170° C., or 130° C. to 160° C.

In addition, the content of the surfactant mixed with the melt may be 0.01% by weight to 10% by weight, 0.01% by weight to 8% by weight, 0.05% by weight to 5% by weight, 0.07% by weight to 3.5% by weight, 0.1% by weight to 5% by weight, 1% by weight to 5% by weight, 1.5% by weight to 5% by weight, 0.1% by weight to 2.5% by weight, or 0.01% by weight to 3% by weight, based on the total weight of the PHA dispersion on the basis of solids content.

Specifically, the surfactant may be at least one selected from the group consisting of cationic surfactants, anionic surfactants, phosphoric acid-based surfactants, fatty acid-based surfactants, acrylic-based surfactants, urethane-based surfactants, epoxy-based surfactants, and nonionic surfactants, or a polymeric surfactant comprising at least one selected from the group consisting of carboxylic acids, amines, isocyanates, and derivatives thereof.

For example, the surfactant may be at least one selected from the group consisting of polyvinyl alcohol, sodium dodecylbenzene sulfonate, polyvinylpyrrolidone, methyl polyethylene alkyl ether, alkyl benzene sulfonate, nonylphenol ether sulfate, sodium lauryl sulfate, lithium dodecyl sulfate, alkyl phosphate, glyceryl esters, and polypropylene glycol esters. In the melt dispersion method, a sodium dodecylbenzene sulfonate surfactant may be preferable since it can form an efficient core-shell and control the zeta potential to a desirable range, but it is not limited thereto.

The first dispersion treatment may be carried out by dispersion treatment for 20 minutes to 60 minutes using a homogenizer at a rate of 60% to 80% of the maximum rotational speed per minute (rpm). For example, the first dispersion step may be carried out by dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

In addition, the second dispersion treatment at high pressure may be carried out by high-pressure dispersion treatment for 20 minutes to 60 minutes using a homogenizer at a rate of 60% to 80% of the maximum rotational speed per minute (rpm). For example, the second dispersion step at high pressure may be carried out by high-pressure dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

The solvent used in the second dispersion treatment at high pressure may be water, distilled water, or a hydrophilic solvent. Specifically, the solvent may be water, distilled water, or a hydrophilic solvent, or a mixture of water, distilled water, and a hydrophilic solvent. For example, the hydrophilic solvent may be at least one selected from the group consisting of methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

Solvent Extraction Method

The process for preparing a polyhydroxyalkanoate (PHA) dispersion according to another embodiment of the present invention may comprise (3-1) preparing polyhydroxyalkanoate (PHA); and (3-2) dispersing the polyhydroxyalkanoate (PHA) in a solvent using a solvent extraction method.

First, polyhydroxyalkanoate (PHA) may be prepared (step (3-1)).

Details on the PHA are as described above.

In the solvent extraction method, unlike the particle dispersion method, the PHA prepared in step (3-1) may not be PHA obtained by cell disruption using a non-mechanical or chemical method. Specifically, since the solvent extraction method comprises mixing PHA with a specific first solvent to prepare a first solution, dispersibility can be further enhanced even if PHA obtained by cell disruption using a mechanical or physical method to have an average particle diameter relatively larger than that of PHA obtained by cell disruption using a non-mechanical or chemical method is used.

For example, even if the PHA obtained in step (3-1) by cell disruption using a mechanical or physical method is in a form with a large average particle diameter, such as granules or pellets, the dispersibility can be further enhanced.

Thereafter, the polyhydroxyalkanoate (PHA) may be dispersed in a solvent using a solvent extraction method (step (3-2)).

Specifically, the dispersing step may comprise mixing the polyhydroxyalkanoate (PHA) with a first solvent to prepare a first solution; mixing a surfactant with a second solvent to prepare a second solution; mixing the first solution and the second solution; and subjecting the mixture to ultrasonic dispersion treatment.

The first solvent may be at least one selected from the group consisting of chloroform, ethyl acetate, butyl acetate, isobutyl acetate, amyl acetate, isoamyl acetate, propyl propionate, butyl propionate, isobutyl propionate, ethyl butyrate, isobutyl isobutyrate, dichloromethane, N,N-dimethylformamide, dimethylacetamide, dimethyl sulfoxide, N-methylpyrrolidone, methyl ethyl ketone, methylene chloride, tetrahydrofuran, toluene, and acetone.

As a solvent with high solubility with PHA is used as the first solvent, dispersibility can be enhanced. Chloroform may be preferable because of its high solubility with PHA, but it is not limited thereto.

In the preparation step of a first solution, the weight ratio of the first solvent to the PHA may be 1:9, 1.5:8.5, 2:8, or 3:7.

The second solvent may be water, distilled water, or a hydrophilic solvent. Specifically, the solvent may be water, distilled water, or a hydrophilic solvent, or a mixture of water, distilled water, and a hydrophilic solvent. For example, the hydrophilic solvent may be at least one selected from the group consisting of methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol.

The content of the surfactant mixed in the preparation step of a second solution may be 0.01% by weight to 10% by weight, 0.01% by weight to 8% by weight, 0.05% by weight to 5% by weight, 0.07% by weight to 3.5% by weight, 0.1% by weight to 5% by weight, 1% by weight to 5% by weight, 1.5% by weight to 5% by weight, 0.1% by weight to 2.5% by weight, or 0.01% by weight to 3% by weight, based on the total weight of the PHA dispersion on the basis of solids content.

Specifically, the surfactant may be at least one selected from the group consisting of cationic surfactants, anionic surfactants, phosphoric acid-based surfactants, fatty acid-based surfactants, acrylic-based surfactants, urethane-based surfactants, epoxy-based surfactants, and nonionic surfactants, or a polymeric surfactant comprising at least one selected from the group consisting of carboxylic acids, amines, isocyanates, and derivatives thereof.

For example, the surfactant may be at least one selected from the group consisting of polyvinyl alcohol, sodium dodecylbenzene sulfonate, polyvinylpyrrolidone, methyl polyethylene alkyl ether, alkyl benzene sulfonate, nonylphenol ether sulfate, sodium lauryl sulfate, lithium dodecyl sulfate, alkyl phosphate, glyceryl esters, and polypropylene glycol esters. In the solvent extraction method, a polyvinyl alcohol surfactant may be preferable since it has rapid and high solubility with the second solvent, especially, water or distilled water, to enhance the mixability, but it is not limited thereto.

In addition, the step of preparing a second solution may further comprise a dispersion treatment step. For example, the dispersion step may be carried out by dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

Thereafter, the mixed solution of the first solution and the second solution may be subjected to ultrasonic dispersion treatment for 1 hour or less at an energy level of 20 Hz or more. For example, the ultrasonic dispersion treatment may be carried out by ultrasonic treatment for 1 hour or less, 55 minutes or less, 50 minutes or less, or 45 minutes or less, or 5 minutes or more, 10 minutes or more, 15 minutes or more, or 20 minutes or more, at an energy level of 20 Hz or more, 25 Hz or more, 30 Hz or more, 40 Hz or more, or 50 Hz or more.

In addition, after the ultrasonic dispersion treatment step, a step of distilling the mixed solution of the first solution and the second solution at a reduced pressure may be additionally carried out. For example, residual solvents may be removed from the mixed solution using a reduced pressure distillation at 60° C. or lower, 50° C. or lower, or 40° C. or lower.

In addition, after the ultrasonic dispersion treatment step, steps of filtering, washing, and redispersing the mixed solution of the first solution and the second solution may be additionally carried out. Specifically, after the mixture from which the residual solvents have been removed through a reduced-pressure distillation is filtered and washed, a step of redispersing it may be additionally carried out.

The filtration step may be carried out using a filter medium such as paper, a woven fabric, a nonwoven fabric, a screen, a polymer membrane, or a wedge wire, and may be carried out using a suction filter, a pressure filter, a membrane separator, a vacuum filter, a reduced-pressure vacuum filter, an industrial filter press, a tube press, a plate press, a gauge press, a belt press, a screw press, a disk press, a pressurizing function press, or a centrifuge.

The washing step and the redispersion step may be carried out using the second solvent. Specifically, the solvent used in the washing step may be water, distilled water, or a hydrophilic solvent, or a mixture of water, distilled water, and a hydrophilic solvent.

In addition, the redispersion may be carried out by dispersion treatment for 20 minutes to 60 minutes, 25 minutes to 55 minutes, 25 minutes to 45 minutes, or 25 minutes to 40 minutes using a homogenizer at a rate of 60% to 80%, 65% to 75%, or 60% to 70% of the maximum rotational speed per minute (rpm).

Process for Preparing a Biodegradable Article

The process for preparing a biodegradable article according to another embodiment of the present invention comprises preparing a polyhydroxyalkanoate (PHA) dispersion; and forming a biodegradable coating layer from the polyhydroxyalkanoate (PHA) dispersion.

Details on the preparation of a PHA dispersion are as described above.

Thereafter, a biodegradable coating layer is formed on one side of a substrate using the PHA dispersion.

According to an embodiment of the present invention, the step of forming a biodegradable coating layer may be carried out by applying the PHA dispersion on a substrate and drying it.

The substrate is not limited as long as it can form a biodegradable coating layer on the surface of the substrate. For example, the substrate may be at least one selected from the group consisting of paper, kraft paper, a fabric, a nonwoven fabric, a polyethylene terephthalate (PET) film, a polyester film such as polybutylene succinate (PBS), polybutylene adipate (PBA), polybutylene adipate terephthalate (PBAT), and polybutylene succinate terephthalate (PBST), and a polyimide (PI) film.

Specifically, the substrate may preferably be a substrate of a single material from the viewpoint of enhancing the coatability of the substrate. The substrate may be paper, kraft paper, fabric, or non-woven fabric, but it is not limited thereto. In addition, when the substrate comprises paper or kraft paper, it may be more advantageous for providing an environmentally friendly packaging material since it has better biodegradability than other plastic materials.

The substrate may have a thickness of 20 μm or more. For example, the thickness of the substrate may be 20 μm or more, 50 μm or more, 70 μm or more, 100 μm or more, 130 μm or more, 150 μm or more, 200 μm or more, 300 μm or more, or 500 μm or more.

In addition, the substrate may have a basis weight of 30 $g/m^2$ to 500 $g/m^2$. For example, when the substrate is paper, kraft paper, woven, knitted, or non-woven fabric, the basis weight of the substrate may be 30 $g/m^2$ to 500 $g/m^2$, 30 $g/m^2$ to 350 $g/m^2$, 30 $g/m^2$ to 200 $g/m^2$, 50 $g/m^2$ to 200 $g/m^2$, 80

$g/m^2$ to 200 $g/m^2$, 100 $g/m^2$ to 200 $g/m^2$, 130 $g/m^2$ to 190 $g/m^2$, 150 $g/m^2$ to 185 $g/m^2$, or 120 $g/m^2$ to 320 $g/m^2$.

Meanwhile, a barrier layer may be disposed on at least one side of the substrate. An environmentally friendly barrier film may be coated on the surface of the substrate to have moisture and/or oxygen barrier properties, or a functional coating layer having antistatic properties or adhesive properties may be further formed. The functional coating layer may comprise a primer coating layer and an adhesive coating layer, which may have materials and physical properties that are commonly used as long as they do not impair the effect desired in the present invention.

In addition, the PHA dispersion may be applied onto the substrate in a coating amount of 5 $g/m^2$ to 100 $g/m^2$. For example, the coating amount may be 5 $g/m^2$ to 100 $g/m^2$, 5 $g/m^2$ to 85 $g/m^2$, 5 $g/m^2$ to 70 $g/m^2$, 8 $g/m^2$ to 60 $g/m^2$, 9 $g/m^2$ to 50 $g/m^2$, or 10 $g/m^2$ to 40 $g/m^2$. As the coating amount satisfies the above range, coatability, productivity, and processability can be further enhanced.

In addition, the coating may be performed once to form a single coating layer or may be performed twice or more to form a plurality of coating layers. The coating amount can be adjusted within the above range depending on the desired number of coating layers. Specifically, the coating amount may be the total amount applied to a plurality of coating layers.

Once the PHA dispersion has been applied onto the substrate, it may be dried for 5 seconds to 30 minutes at 100° C. to 200° C. For example, the drying may be carried out for 5 seconds to 30 minutes, 10 seconds to 25 minutes, 20 seconds to 20 minutes, 30 seconds to 15 minutes, or 40 seconds to 10 minutes, at 100° C. to 200° C., 110° C. to 185° C., 120° C. to 180° C., or 130° C. to 175° C.

The formation of a biodegradable coating layer may be carried out without particular limitations as long as it is a coating process generally used in the art. For example, the formation of a biodegradable coating layer may be carried out by gravure coating, slot coating, doctor blade coating, spray coating, bar coating, spin coating, or in-line coating, but it is not limited thereto.

Biodegradable Article

The biodegradable article according to another embodiment of the present invention comprises a substrate; and a biodegradable coating layer, wherein the biodegradable coating layer comprises polyhydroxyalkanoate (PHA) particles, the average particle diameter of the dispersed polyhydroxyalkanoate (PHA) particles is 0.5 μm to 5 μm, and the particle size deviation is within ±0.3 μm.

FIG. 4 shows a biodegradable article according to an embodiment of the present invention. FIG. 5 shows a biodegradable article according to another embodiment of the present invention.

Specifically, FIG. 4 illustrates a biodegradable article (1) in which a biodegradable coating layer (200) is formed on one side of a substrate (100). FIG. 5 illustrates a biodegradable article (1) in which a biodegradable coating layer (200) is formed on both sides of a substrate (100).

As the biodegradable article comprises a biodegradable coating layer on one or both sides of a substrate, and the biodegradable coating layer comprises PHA particles having an average particle diameter of 0.5 μm to 5 μm and a particle size deviation within ±0.3 μm, it is environmentally friendly by virtue of excellent biodegradability and biocompatibility and can have excellent dispersibility, coatability, productivity, and processability.

Details on the substrate are as described above.

In addition, the biodegradable coating layer may have a thickness of 5 μm to 50 μm, 5 μm to 40 μm, or 6 μm to 30 μm, but it is not limited thereto.

The biodegradable article comprising the biodegradable coating layer may be a packaging material, a cardboard box, a shopping bag, a disposable tableware, a packaging container, or a paper straw, but it is not limited thereto.

EMBODIMENTS FOR CARRYING OUT THE INVENTION

Hereinafter, the present invention will be described in more detail with reference to the following examples. But the following Examples are intended to illustrate the present invention, and the scope of the Examples is not limited thereto only.

EXAMPLE

Preparation of a PHA Dispersion

<Particle Dispersion Method>

Example 1

(1) Preparation of PHA

A polyhydroxyalkanoate (PHA) powder (content of 4-hydroxybutyrate (4-HB): 10% by weight, weight average molecular weight (Mw): 800,000 g/mole, polydispersity index (PDI): 2.0, manufacturer: CJ) was prepared. The PHA powder was obtained by physical crushing using a homogenizer (product name: Homomixer Mark II, manufacturer: Primix).

(2) Preparation of a PHA Dispersion

A 1-liter glass beaker was charged with 30 parts by weight of the PHA powder, 20 parts by weight of polyvinyl alcohol (PVA, manufacturer: Kuraray, hydrolysis rate: 80%) having a concentration of 10% as a surfactant, and 50 parts by weight of distilled water (DI water), which was subjected to a first dispersion treatment for 30 minutes using a homogenizer (linear speed: 1,250 cm/sec, product name: Homomixer Mark II, manufacturer: Primix, maximum rotation speed per minute: 12,000 rpm) at a speed of 70% of the maximum rotation speed per minute to prepare a first aqueous dispersion.

Thereafter, the first aqueous dispersion was filtered using a pressure filter, washed with water, additionally added with distilled water, and subjected to a second dispersion treatment in the aqueous system using a homogenizer (product name: Homomixer Mark II, manufacturer: Primix) to prepare a PHA dispersion having a solids content of 40% by weight.

Example 2

A PHA dispersion was prepared in the same manner as in Example 1, except that, in step (1), a polyhydroxyalkanoate (PHA) powder (content of 4-hydroxybutyrate (4-HB): 10% by weight, weight average molecular weight (Mw): 380,000 g/mole, polydispersity index (PDI): 1.9, manufacturer: CJ) was prepared.

Example 3

(1) Preparation of PHA

A polyhydroxyalkanoate (PHA) having a solids content of 5% by weight (content of 4-hydroxybutyrate (4-HB): 10% by weight, weight average molecular weight (Mw): 800,000 g/mole, polydispersity index (PDI): 1.9, manufacturer: CJ) was prepared. The PHA was obtained by physical crushing using a homogenizer (product name: Homomixer Mark II, manufacturer: Primix).

(2) Preparation of a PHA Dispersion

A 1-liter glass beaker was charged with 600 parts by weight of the PHA and 20 parts by weight of polyvinyl alcohol (PVA, manufacturer: Kuraray, hydrolysis rate: 80%) having a concentration of 10% as a surfactant, which was subjected to a first dispersion treatment for 30 minutes using a homogenizer (linear speed: 1,250 cm/sec, product name: Homomixer Mark II, manufacturer: Primix, maximum rotation speed per minute: 12,000 rpm) at a speed of 70% of the maximum rotation speed per minute to prepare a first aqueous dispersion.

Thereafter, the first aqueous dispersion was filtered using a pressure filter, washed with water, additionally added with distilled water, and subjected to a second dispersion treatment in the aqueous system using a homogenizer (product name: Homomixer Mark II, manufacturer: Primix) to prepare a PHA dispersion having a solids content of 40% by weight.

Example 4

A PHA dispersion was prepared in the same manner as in Example 3, except that, in step (1), a polyhydroxyalkanoate (PHA) having a solids content of 10% by weight (content of 4-hydroxybutyrate (4-HB): 10% by weight, weight average molecular weight (Mw): 900,000 g/mole, polydispersity index (PDI): 1.6, manufacturer: CJ) was prepared; and, in step (2), 400 parts by weight of the PHA was used.

Example 5

(1) Preparation of PHA

A polyhydroxyalkanoate (PHA) powder (content of 4-hydroxybutyrate (4-HB): 10% by weight, weight average molecular weight (Mw): 600,000 g/mole, polydispersity index (PDI): 1.92, manufacturer: CJ) was prepared. The PHA powder was obtained by chemical crushing using sodium dodecylbenzene sulfonate.

(2) Preparation of a PHA Dispersion

A 1-liter glass beaker was charged with 40 parts by weight of the PHA powder, 1 part by weight of polyvinyl alcohol (PVA, manufacturer: Kuraray, hydrolysis rate: 80%) having a concentration of 10% as a surfactant, and 60 parts by weight of distilled water (DI water), which was subjected to a first dispersion treatment for 30 minutes using a homogenizer (linear speed: 1,250 cm/sec, product name: Homomixer Mark II, manufacturer: Primix, maximum rotation speed per minute: 12,000 rpm) at a speed of 70% of the maximum rotation speed per minute to prepare a first aqueous dispersion.

Thereafter, the first aqueous dispersion was filtered using a pressure filter, washed with water, additionally added with distilled water, and subjected to a second dispersion treatment in the aqueous system using a homogenizer (product name: Homomixer Mark II, manufacturer: Primix) to prepare a PHA dispersion having a solids content of 40.1% by weight.

Example 6

A PHA dispersion was prepared in the same manner as in Example 1 using the PHA powder prepared in step (1) of Example 5.

Example 7

A PHA dispersion was prepared in the same manner as in Example 3, except that, in step (1), a polyhydroxyalkanoate (PHA) having a solids content of 10% by weight (content of 4-hydroxybutyrate (4-HB): 10% by weight, weight average molecular weight (Mw): 600,000 g/mole, polydispersity index (PDI): 1.92, manufacturer: CJ) was prepared.

<Melt Dispersion Method>

Example 8

(1) Preparation of PHA

A polyhydroxyalkanoate (PHA) granule (content of 4-hydroxybutyrate (4-HB): 10% by weight, weight average molecular weight (Mw): 800,000 g/mole, polydispersity index (PDI): 1.9, manufacturer: CJ) was prepared. The PHA granule was obtained by physical crushing using a homogenizer (product name: Homomixer Mark II, manufacturer: Primix).

(2) Preparation of a PHA Dispersion 30 parts by weight of the PHA granule was melted at 170° C. and then mixed with 2 parts by weight of sodium dodecylbenzene sulfonate (SDS), which was subjected to a first dispersion treatment for 30 minutes using a homogenizer (linear speed: 1,250 cm/sec, product name: Homomixer Mark II, manufacturer: Primix, maximum rotation speed per minute: 12,000 rpm) at a speed of 70% of the maximum rotation speed per minute to prepare a first aqueous dispersion.

Thereafter, the first aqueous dispersion was subjected to a second high-pressure dispersion treatment in a solvent for 30 minutes using a high-pressure homogenizer (product name: Homomixer Mark II, manufacturer: Premix, maximum rotation speed per minute: 8,000 rpm) to prepare a PHA dispersion having a solids content of 40% by weight.

<Solvent Extraction Method>

Example 9

(1) Preparation of PHA and a First Solution

Polyhydroxyalkanoate (PHA) pellets (content of 4-hydroxybutyrate (4-HB): 10% by weight, weight average molecular weight (Mw): 800,000 g/mole, polydispersity index (PDI): 2.0, manufacturer: CJ) were prepared. The PHA pellets were obtained by physical crushing using a homogenizer (product name: Homomixer Mark II, manufacturer: Primix).

In addition, 10 parts by weight of the PHA pellets were mixed with 90 parts by weight of chloroform to prepare a first solution.

(2) Preparation of a Second Solution

A 1-liter glass beaker was charged with 20 parts by weight of polyvinyl alcohol (PVA, manufacturer: Kuraray, hydrolysis rate: 80%) having a concentration of 2% as a surfactant, followed by addition of distilled water as a second solvent, which was subjected to dispersion treatment for 5 minutes using a homogenizer (linear speed: 1,250 cm/sec, product name: Homomixer Mark II, manufacturer: Primix, maximum rotation speed per minute: 12,000 rpm) at a speed of 10% of the maximum rotation speed per minute to prepare a second solution.

(3) Preparation of a PHA Dispersion

A mixed solution of the first solution and the second solution was subjected to ultrasonic dispersion treatment for 30 minutes at an energy level of 35 Hz or more.

Residual solvents were removed from the mixed solution, subjected to ultrasonic dispersion treatment, at 40° C. using a vacuum distiller (product name: N-21000, manufacturer: Eyela), which was then filtered using a pressure filter, washed with water, and then redispersed in the water system to prepare a PHA dispersion having a solids content of 40% by weight.

Example 10

A PHA dispersion was prepared in the same manner as in Example 9, except that, in step (1), polyhydroxyalkanoate (PHA) pellets (content of 4-hydroxybutyrate (4-HB): 50% by weight, weight average molecular weight (Mw): 900,000 g/mole, polydispersity index (PDI): 1.6, manufacturer: CJ) were prepared.

Comparative Example 1

(1) Preparation of PHA

The same PHA powder as in step (1) of Example 1 was prepared.

(2) Preparation of a PHA Dispersion

A 1-liter glass beaker was charged with 30 parts by weight of the PHA powder and 70 parts by weight of distilled water (DI water), which was subjected to a first dispersion treatment for 30 minutes using a homogenizer (linear speed: 1,250 cm/sec, product name: Homomixer Mark II, manufacturer: Primix, maximum rotation speed per minute: 12,000 rpm) at a speed of 70% of the maximum rotation speed per minute to prepare a PHA dispersion having a solids content of 30% by weight.

Comparative Example 2

A PHA dispersion was prepared in the same manner as in Example 5, except that no surfactant was added in step (2).

Comparative Example 3

A PHA dispersion was prepared in the same manner as in step (2) of Comparative Example 1 using the same PHA pellets as in step (1) of Example 10.

Comparative Example 4

A PHA dispersion was prepared in the same manner as in Example 1, except that, in step (2), dispersion treatment was carried out for 30 minutes using a homogenizer (linear speed: 1,250 cm/sec, product name: Homomixer Mark II, manufacturer: Primix, maximum rotation speed per minute: 12,000 rpm) at a speed of 40% of the maximum rotation speed per minute.

TEST EXAMPLE

Test Example 1: Haze

The PHA dispersions of Examples 1 to 10 and Comparative Examples 1 to 4 were each measured for haze using a haze meter (CM-5, manufactured by Konica Minolta).

Test Example 2: Color

The PHA dispersions of Examples 1 to 10 and Comparative Examples 1 to 4 were each measured for color characteristics L*, a*, and b* using a spectrophotometer CM-5 (manufacturer: Konica Minolta).

Test Example 3: Yellow Index (Y.I.)

The PHA dispersions of Examples 1 to 10 and Comparative Examples 1 to 4 were each measured for yellow index using a spectrophotometer CM-5 (manufacturer: Konica Minolta) according to ASTM E313.

Test Example 4: Zeta Potential

The PHA dispersions of Examples 1 to 10 and Comparative Examples 1 to 4 were each measured for zeta potential using a ZetaPlus Zeta Potential Analyzer (manufacturer: Brookhaven Instruments).

Test Example 5: Average Particle Diameter and Particle Size Deviation

The PHA particles contained in each of the PHA dispersions of Examples 1 to 10 and Comparative Examples 1 to 4 were measured for average particle diameter and particle size deviation through dynamic light scattering (DLS) at a temperature of 25° C. and a measurement angle of 1750 using Zetasizer Nano ZS (manufacturer: Marven). Here, the value of the peak derived through the polydispersity index (PDI) in the confidence interval of 0.5 is taken as the particle size.

Test Example 6: Dispersion Stability

The PHA dispersions of Examples 1 to 10 and Comparative Examples 1 to 4 were each placed in a test tube and left for 2 weeks at 50° C. It was then visually evaluated for dispersion stability according to the following evaluation criteria.

⊚: Neither phase separation nor precipitation took place

○: Slight phase separation took place while no precipitation took place

Δ: Some phase separation and precipitation took place x: Remarkable phase separation and precipitation took place

Test Example 7: Viscosity

The PHA dispersions of Examples 1 to 10 and Comparative Examples 1 to 4 were each measured for viscosity with a viscometer (manufacturer: Brookfield) that measures viscosity using shear stress at a shear rate of 12 rpm at about 23° C.

TABLE 1

| | Haze (%) | L* | a* | b* | Y.I. | Zeta potential (mV) | Avg. particle diameter (μm) | Particle size deviation (μm) |
|---|---|---|---|---|---|---|---|---|
| Ex. 1 | 305 | 48.86 | 0.34 | 4.53 | 11.57 | −56.1 | 2.75 | ±0.3 |
| Ex. 2 | 236 | 51.97 | 0.33 | 3.72 | 9.10 | −62.4 | 2.83 | ±0.3 |
| Ex. 3 | 313 | 48.17 | 0.33 | 4.60 | 11.83 | −56.6 | 2.73 | ±0.3 |
| Ex. 4 | 331 | 54.41 | 0.12 | 5.52 | 12.92 | −52.9 | 1.21 | ±0.3 |
| Ex. 5 | 304 | 50.78 | 0.09 | 4.89 | 11.94 | −98.7 | 2.32 | ±0.3 |
| Ex. 6 | 298 | 48.32 | 0.09 | 4.49 | 11.54 | −88.1 | 2.38 | ±0.3 |
| Ex. 7 | 275 | 49.70 | 0.14 | 4.25 | 10.70 | −93.1 | 2.52 | ±0.3 |
| Ex. 8 | 325 | 54.69 | 0.11 | 5.46 | 12.72 | −63.5 | 2.13 | ±0.3 |
| Ex. 9 | 305 | 48.13 | 0.38 | 4.44 | 11.45 | −58.5 | 3.17 | ±0.3 |
| Ex. 10 | 288 | 49.84 | 0.40 | 4.34 | 10.91 | −64.2 | 3.42 | ±0.3 |
| C. Ex. 1 | 232 | 47.30 | 0.44 | 5.43 | 10.22 | −24.6 | 80.22 | ±0.3 |
| C. Ex. 2 | 256 | 48.20 | 0.11 | 4.12 | 9.90 | −35.3 | 3.21 | ±30 |
| C. Ex. 3 | — | — | — | — | — | — | — | — |
| C. Ex. 4 | 282 | 49.2 | 0.12 | 4.52 | 10.02 | −53.2 | 5.12 | ±2 |

TABLE 2

| | Dispersion stability | Viscosity (mPa · s) |
|---|---|---|
| Ex. 1 | ◎ | 260 |
| Ex. 2 | ◎ | 280 |
| Ex. 3 | ◎ | 190 |
| Ex. 4 | ◎ | 250 |
| Ex. 5 | ◎ | 310 |
| Ex. 6 | ◎ | 270 |
| Ex. 7 | ◎ | 150 |
| Ex. 8 | ○ | 120 |
| Ex. 9 | ○ | 180 |
| Ex. 10 | ○ | 200 |
| C. Ex. 1 | Δ | 310 |
| C. Ex. 2 | X | Not measurable |
| C. Ex. 3 | X | Not measurable |
| C. Ex. 4 | Δ | 320 |

As can be seen from Tables 1 and 2 above, the PHA dispersions of Examples 1 to 10 had very excellent dispersibility and processability as compared with the dispersions of Comparative Examples 1 to 4.

Specifically, as the PHA dispersions of Examples 1 to 10 were prepared by the particle dispersion method, melt dispersion method, or solvent extraction method according to an embodiment of the present invention, the average particle diameter and particle size deviation of the PHA particles contained in the PHA dispersion satisfied the specific ranges, and they had zeta potential, dispersion stability, and viscosity satisfying the desirable ranges, resulting in excellent dispersibility and processability.

In contrast, in the PHA dispersions of Comparative Examples 1 to 4, the average particle diameter and particle size deviation of the PHA particles contained therein did not satisfy the specific ranges, and they had zeta potential, dispersion stability, and viscosity that did not satisfy the desirable ranges, resulting in poor dispersibility, dispersion stability, and processability. In particular, in Comparative Example 3, PHA was not dissolved or dispersed at all.

The invention claimed is:

1. A polyhydroxyalkanoate (PHA) dispersion comprising particles including PHA, wherein an average particle diameter of the particles is 0.5 μm to 5 μm, and the particle size deviation is within +0.3 μm.

2. The polyhydroxyalkanoate (PHA) dispersion of claim 1, wherein the PHA has:

a weight average molecular weight of 10,000 g/mole to 1,200,000 g/mole and a polydispersity index (PDI) of less than 2.5, or a crystallinity of 90% or less as measured by a differential scanning calorimeter (DSC) and a glass transition temperature (Tg) of −45° C. to 80° C.

3. The polyhydroxyalkanoate (PHA) dispersion of claim 1, wherein the PHA comprises a polyhydroxyalkanoate (PHA) copolymer including at least one repeat unit selected from the group consisting of 33-hydroxypropionate (3-HP), 3-hydroxyhexanoate (3-HH), 3-hydroxyvalerate (3-HV), 4-hydroxyvalerate (4-HV), 5-hydroxyvalerate (5-HV), and 6-hydroxyhexanoate (6-HH) repeat units.

4. The polyhydroxyalkanoate (PHA) dispersion of claim 3, wherein the polyhydroxyalkanoate (PHA) copolymer comprises a 4-hydroxybutyrate (4-HB) repeat unit in an amount of 0.1% by weight to 60% by weight based on the total weight of the polyhydroxyalkanoate (PHA) copolymer.

5. The polyhydroxyalkanoate (PHA) dispersion of claim 1, wherein the polyhydroxyalkanoate (PHA) dispersion further comprises a biodegradable polymer, and the biodegradable polymer comprises at least one selected from the group consisting of polylactic acid (PLA), polybutylene adipate terephthalate (PBAT), polybutylene succinate (PBS), thermoplastic starch (TPS), polybutylene succinate terephthalate (PBST), polyethylene terephthalate (PET), polybutylene succinate adipate (PBSA), polybutylene adipate (PBA), polypropylene (PP), polyethylene (PE), and polycaprolactone (PCL).

6. The polyhydroxyalkanoate (PHA) dispersion of claim 1, wherein the polyhydroxyalkanoate (PHA) dispersion has a solids content of 10% by weight to 60% by weight, and the polyhydroxyalkanoate (PHA) dispersion comprises a surfactant in an amount of 0.01% by weight to 10% by weight based on the total weight of the polyhydroxyalkanoate (PHA) dispersion on the basis of solids content.

7. The polyhydroxyalkanoate (PHA) dispersion of claim 6, wherein the surfactant comprises at least one selected from the group consisting of cationic surfactants, anionic surfactants, phosphoric acid-based surfactants, fatty acid-based surfactants, acrylic-based surfactants, urethane-based surfactants, epoxy-based surfactants, and nonionic surfactants, or a polymeric surfactant comprising at least one selected from the group consisting of carboxylic acids, amines, isocyanates, and derivatives thereof.

8. The polyhydroxyalkanoate (PHA) dispersion of claim 1, wherein the polyhydroxyalkanoate (PHA) dispersion has;

a haze of 100% to 400% and a yellow index (Y.I.) of 5 to 20, an L* of 40 or more, an a* of less than 0.44, and a b* of 6 or less, a zeta potential of −10 mV or less, or a pH of 3 to 11 and a light transmittance of 10% to 99%.

9. A process for preparing the PHA dispersion of claim 1, the process comprising dispersing PHA in a solvent using a particle dispersion method, a melt dispersion method, or a solvent extraction method, wherein the average particle diameter of the dispersed particles is 0.5 μm to 5 μm, and the particle size deviation is within ±0.3 μm.

10. The process for preparing a polyhydroxyalkanoate (PHA) dispersion of claim 9, wherein the process for preparing a polyhydroxyalkanoate (PHA) dispersion is carried out with at least one device selected from the group consisting of an agitator, a homogenizer, a high-pressure homogenizer, a microfluidizer, and a colloid mill, or by at least one method selected from the group consisting of high shear, ultrasonicator, and membrane emulsification.

11. The process for preparing a polyhydroxyalkanoate (PHA) dispersion of claim 9, the process comprising (1-1) preparing the polyhydroxyalkanoate (PHA) obtained by cell disruption using a physical or chemical method; and (1-2) dispersing the polyhydroxyalkanoate (PHA) in a solvent using a particle dispersion method, wherein the dispersing comprises adding a surfactant in an amount of 0.01% by weight to 10% by weight based on a total weight of the polyhydroxyalkanoate (PHA) dispersion on a basis of solids content.

12. The process for preparing a polyhydroxyalkanoate (PHA) dispersion of claim 11, wherein the dispersing comprises;

(i) adding a surfactant in an amount of 0.01% by weight to 10% by weight based on a total weight of the polyhydroxyalkanoate (PHA) dispersion on a basis of solids content, or (ii) carrying out a dispersion by high-speed dispersion treatment for 10 minutes to 60 minutes using a homogenizer at a rate of 60% to 80% of the maximum rotational speed per minute (rpm), or (iii carrying out a first dispersion treatment; and carrying out a second dispersion treatment, and the first dispersion step is carried out by filtering, washing, and the second dispersion treatment of the first aqueous dispersion that has been subjected to the first dispersion treatment.

13. The process for preparing a polyhydroxyalkanoate (PHA) dispersion of claim 9, the process comprising (2-1) preparing the polyhydroxyalkanoate (PHA); and (2-2) dispersing the polyhydroxyalkanoate (PHA) in a solvent using a melt dispersion method, wherein the dispersing comprises:

melting the polyhydroxyalkanoate (PHA);

mixing the molten polyhydroxyalkanoate with a surfactant to produce a mixture; and dispersing the mixture at high pressure in a solvent, and the melting is carried out at 100° C. to 220° C.

14. The process for preparing a polyhydroxyalkanoate (PHA) dispersion of claim 9, the process comprising (3-1) preparing the polyhydroxyalkanoate (PHA); and (3-2) dispersing the polyhydroxyalkanoate (PHA) in a solvent using a solvent extraction method, wherein the dispersing comprises:

mixing the polyhydroxyalkanoate (PHA) with a first solvent to prepare a first solution;

mixing a surfactant with a second solvent to prepare a second solution;

mixing the first solution and the second solution to produce a mixture; and subjecting the mixture to an ultrasonic dispersion treatment, and the ultrasonic dispersion treatment is carried out for 1 hour or less at an energy level of 20 Hz or more.

15. The process for preparing a polyhydroxyalkanoate (PHA) dispersion of claim 14, wherein the first solvent comprises at least one selected from the group consisting of chloroform, ethyl acetate, butyl acetate, isobutyl acetate, amyl acetate, isoamyl acetate, propyl propionate, butyl propionate, isobutyl propionate, ethyl butyrate, isobutyl isobutyrate, dichloromethane, N,N-dimethylformamide, dimethylacetamide, dimethyl sulfoxide, N-methylpyrrolidone, methyl ethyl ketone, methylene chloride, tetrahydrofuran, toluene, and acetone, and the second solvent comprises water or alcohol-based solvent.

16. The polyhydroxyalkanoate (PHA) dispersion of claim 1, wherein the PHA comprises a polyhydroxyalkanoate (PHA) copolymer including a 3-hydroxybutyrate (3-HB) repeat unit.

17. The polyhydroxyalkanoate (PHA) dispersion of claim 1, wherein the PHA comprises a polyhydroxyalkanoate (PHA) copolymer including a 4-hydroxybutyrate (4-HB) repeat unit.

18. The polyhydroxyalkanoate (PHA) dispersion of claim 1, wherein the PHA comprises a polyhydroxyalkanoate (PHA) copolymer including a 3-hydroxybutyrate (3-HB) repeat unit and a 4-hydroxybutyrate (4-HB) repeat unit.

19. The polyhydroxyalkanoate (PHA) dispersion of claim 1, wherein the PHA comprises a polyhydroxyalkanoate (PHA) copolymer including a 3-hydroxybutyrate (3-HB) repeat unit in an amount of 20% by weight or more and 99% by weight or less.

20. The polyhydroxyalkanoate (PHA) dispersion according to claim 16, wherein the polyhydroxyalkanoate (PHA) copolymer further comprise at least one repeat unit selected from the group consisting of 2-hydroxybutyrate, lactic acid, glycolic acid, 3-hydroxypropionate (3-HP), 3-hydroxyvalerate (3-HV), 3-hydroxyhexanoate (3-1H), 3-hydroxyheptanoate (3-HHep), 3-hydroxyoctanoate (3-HO), 3-hydroxynonanoate (3-HN), 3-hydroxydecanoate (3-HD), 3-hydroxydodecanoate (3-HDd), 4-hydroxyvalerate (4-HV), a 4-hydroxybutyrate (4-NB), 5-hydroxyvalerate (5-HV), and 6-hydroxyhexanoate (6-HH) repeat units.

* * * * *